United States Patent
Flores et al.

(10) Patent No.: US 10,664,041 B2
(45) Date of Patent: May 26, 2020

(54) IMPLEMENTING A CUSTOMIZED INTERACTION PATTERN FOR A DEVICE

(71) Applicant: International Business Machines Corporation, Armonk, NY (US)

(72) Inventors: Romelia H. Flores, Keller, TX (US); Yu Gu, Cedar Park, TX (US); Kai Liu, Beijing (CN); Su Liu, Austin, TX (US)

(73) Assignee: Inernational Business Machines Corporation, Armonk, NY (US)

( * ) Notice: Subject to any disclaimer, the term of this patent is extended or adjusted under 35 U.S.C. 154(b) by 72 days.

(21) Appl. No.: 15/811,505

(22) Filed: Nov. 13, 2017

(65) Prior Publication Data

US 2019/0146576 A1 May 16, 2019

(51) Int. Cl.
*G06F 3/033* (2013.01)
*G06F 3/01* (2006.01)
*G06F 9/451* (2018.01)
*G06K 9/00* (2006.01)

(52) U.S. Cl.
CPC .............. *G06F 3/011* (2013.01); *G06F 3/013* (2013.01); *G06F 3/017* (2013.01); *G06F 9/453* (2018.02); *G06F 2203/011* (2013.01); *G06F 2203/0381* (2013.01); *G06K 9/00302* (2013.01); *G06K 9/00355* (2013.01)

(58) Field of Classification Search
CPC .......... G06F 3/017; G06F 3/011; G06F 3/013; G06F 2203/0381; G06K 9/00355
See application file for complete search history.

(56) References Cited

U.S. PATENT DOCUMENTS

| | | | |
|---|---|---|---|
| 7,050,606 B2 | 5/2006 | Paul et al. | |
| 8,788,977 B2 | 7/2014 | Bezos | |
| 8,937,589 B2 | 1/2015 | Wei et al. | |
| 8,977,972 B2 | 3/2015 | Anderson et al. | |
| 9,652,042 B2 | 5/2017 | Wilson et al. | |
| 9,691,096 B1* | 6/2017 | Dai | G06Q 30/0631 |
| 9,701,258 B2 | 7/2017 | Tiryaki | |
| 2010/0287799 A1 | 11/2010 | Clegg | |
| 2013/0154913 A1 | 6/2013 | Genc et al. | |
| 2016/0063473 A1 | 3/2016 | Lee | |
| 2016/0125522 A1* | 5/2016 | Tang | G06Q 40/00 705/35 |
| 2018/0007203 A1* | 1/2018 | Batlle | H04M 3/5166 |

(Continued)

FOREIGN PATENT DOCUMENTS

WO 2016110009 A1 7/2016

OTHER PUBLICATIONS

Krum et al., "Speech and Gesture Multimodal Control of a Whole Earth 3D Visualization Environment," Georgia Institute of Technology, 2002, pp. 1-8, retrieved from https://smartech.gatech.edu/bitstream/handle/1853/3258/02-06.pdf (Continued)

*Primary Examiner* — Anil N Kumar
(74) *Attorney, Agent, or Firm* — Zilak-Kotab, P.C.

(57) ABSTRACT

A computer-implemented method according to one embodiment includes identifying one or more input mechanisms for a device, monitoring a plurality of interactions between a user and the device, utilizing the one or more input mechanisms, and implementing a customized interaction pattern for the device, based on the monitoring.

19 Claims, 7 Drawing Sheets

(56) References Cited

U.S. PATENT DOCUMENTS

2018/0247241 A1* 8/2018 Avrahami .......... G06Q 10/0639

OTHER PUBLICATIONS

Krahnstoever et al., "Multimodal Human-Computer Interaction for Crisis Management Systems," Sixth IEEE Workshop on Applications of Computer Vision, Dec. 2002, pp. 1-5.
Athanikar, R., "Method and System for Personalizing Internet of Things using External Inputs," ip.com, IPCOM000241961D, Jun. 11, 2015, 5 pages.
NIST Cloud Computing Program, Dec. 9, 2013, Retrieved From http://www.nist.gov/itl/cloud/, pp. 1-2.
Mell et al., "Definition of Cloud Computing," National Institute of Standards and Technology, Information Technology Laboratory, Version 15, 2009, pp. 1-2.
Mell et al., "The NIST Definition of Cloud Computing," NIST Special Publication 800-145, 2011, pp. 1-7.
Instructables, "Electret Microphone," 2017, pp. 1-8, retrieved from http://www.instructables.com/id/Electret-microphone/.
Itunes Preview, "Free Candle—Blow Out Responsive Candle App," by Poets Road, Inc., iTunes App Store, Nov. 2016, pp. 1-2, retrieved from https://tunes.apple.com/us/app/free-candle-blow-out-responsive-candle-app/d434064534?mt=8.
IBM Cloud Docs, "Getting started with Watson IoT Platform Starter," IBM Cloud Docs, Apr. 19, 2017, pp. 1-2, retrieved from https://console.bluemix.net/docs/starters/IoT/iot500.html.
IBM, "Watson Internet of Things," IBM Watson IoT—IoT Developer, 2017, pp. 1-7, retrieved from https://www.ibm.com/internet-of-things/platform/iot-developer/.

* cited by examiner

IMPLEMENTING A CUSTOMIZED INTERACTION PATTERN FOR A DEVICE

BACKGROUND

The present invention relates to machine learning, and more specifically, this invention relates to dynamically implementing a customized interaction pattern for a device.

Current devices often allow for interaction with one or more users. For example, users may interact with mobile computing devices in order to initiate and operate applications stored within those devices. However, this interaction is often static and does not adjust to accommodate specific user behavior.

SUMMARY

A computer-implemented method according to one embodiment includes identifying one or more input mechanisms for a device, monitoring a plurality of interactions between a user and the device, utilizing the one or more input mechanisms, and implementing a customized interaction pattern for the device, based on the monitoring.

According to another embodiment, a computer program product for implementing a customized interaction pattern for a device includes a computer readable storage medium having program instructions embodied therewith, where the computer readable storage medium is not a transitory signal per se, and where the program instructions are executable by a processor to cause the processor to perform a method comprising identifying one or more input mechanisms for the device, utilizing the processor, monitoring, utilizing the processor, a plurality of interactions between a user and the device, utilizing the one or more input mechanisms, and implementing, utilizing the processor, a customized interaction pattern for the device, based on the monitoring.

A system according to another embodiment includes a processor, and logic integrated with the processor, executable by the processor, or integrated with and executable by the processor, where the logic is configured to identify one or more input mechanisms for a device, monitor a plurality of interactions between a user and the device, utilizing the one or more input mechanisms, and implement a customized interaction pattern for the device, based on the monitoring.

Other aspects and embodiments of the present invention will become apparent from the following detailed description, which, when taken in conjunction with the drawings, illustrate by way of example the principles of the invention.

DETAILED DESCRIPTION

Figure 1:
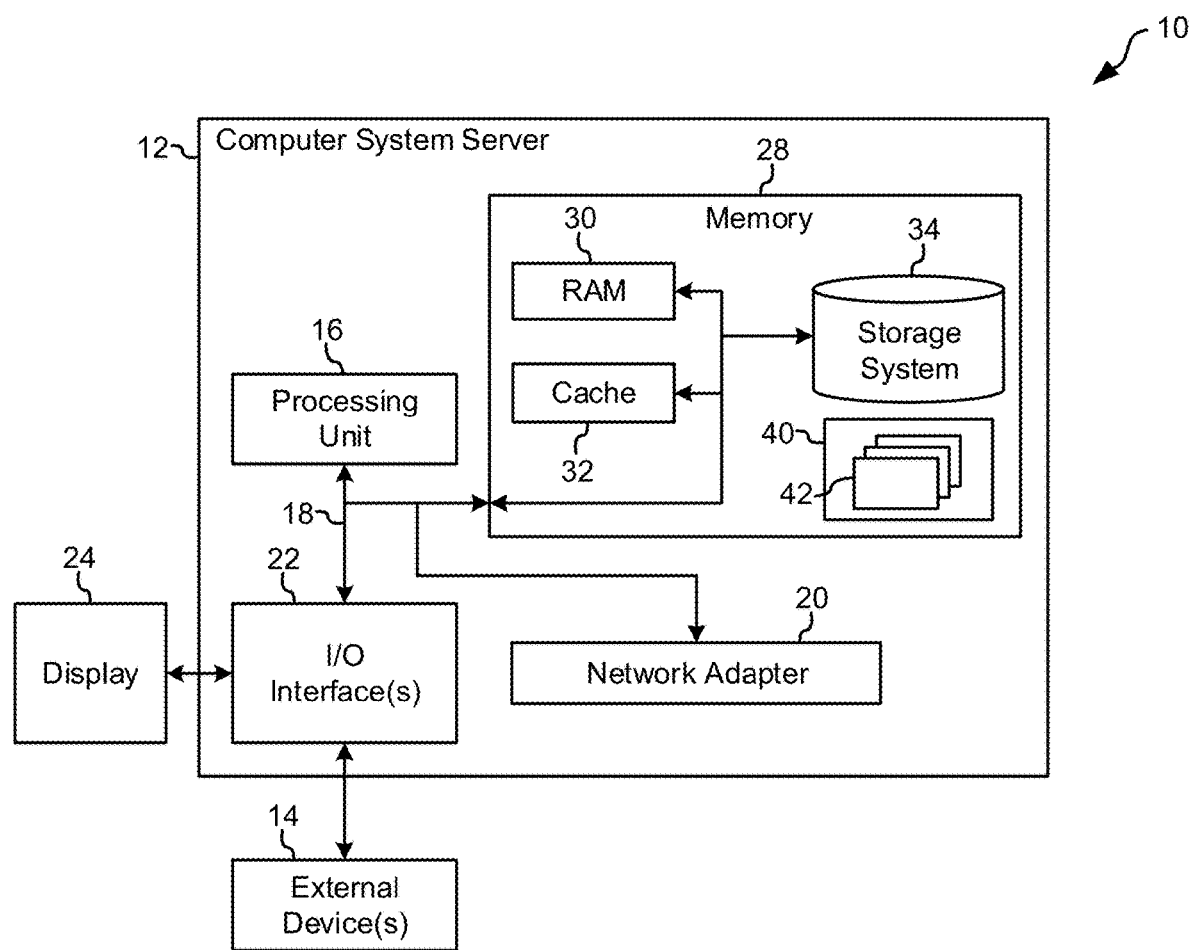
FIG. 1 depicts a cloud computing node according to an embodiment of the present invention.

The following description discloses several preferred embodiments of systems, methods and computer program products for implementing a customized interaction pattern for a device. Various embodiments provide a method for monitoring interactions between a user and a device, and creating and implementing a customized interaction pattern for the device, in response to the monitoring.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for implementing a customized interaction pattern for a device.

In one general embodiment, a computer-implemented method includes identifying one or more input mechanisms for a device, monitoring a plurality of interactions between a user and the device, utilizing the one or more input mechanisms, and implementing a customized interaction pattern for the device, based on the monitoring.

In another general embodiment, a computer program product for implementing a customized interaction pattern for a device includes a computer readable storage medium having program instructions embodied therewith, where the computer readable storage medium is not a transitory signal per se, and where the program instructions are executable by a processor to cause the processor to perform a method comprising identifying one or more input mechanisms for the device, utilizing the processor, monitoring, utilizing the processor, a plurality of interactions between a user and the device, utilizing the one or more input mechanisms, and implementing, utilizing the processor, a customized interaction pattern for the device, based on the monitoring.

In another general embodiment, a system includes a processor, and logic integrated with the processor, executable by the processor, or integrated with and executable by the processor, where the logic is configured to identify one or more input mechanisms for a device, monitor a plurality of interactions between a user and the device, utilizing the one or more input mechanisms, and implement a customized interaction pattern for the device, based on the monitoring.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
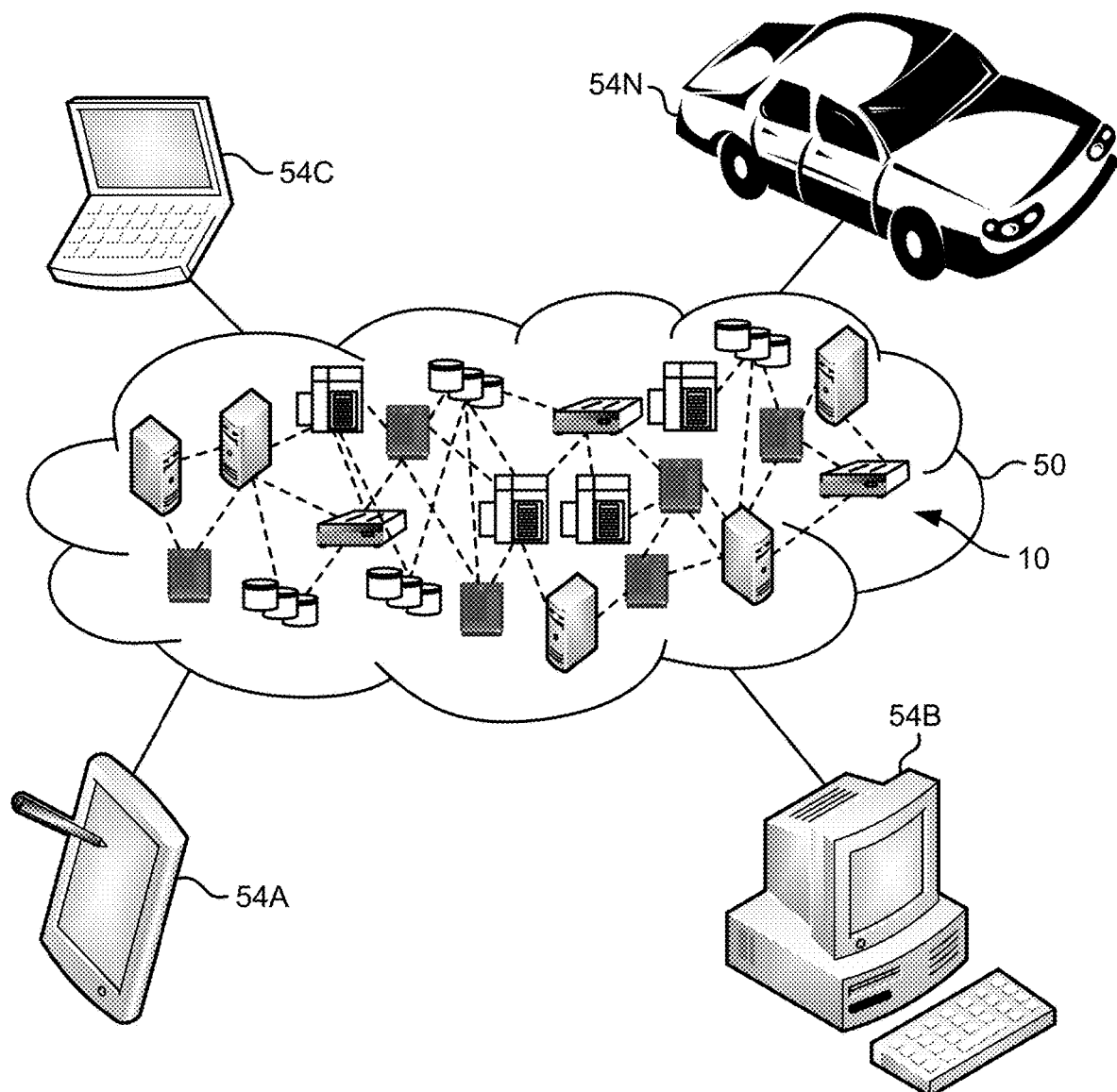
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
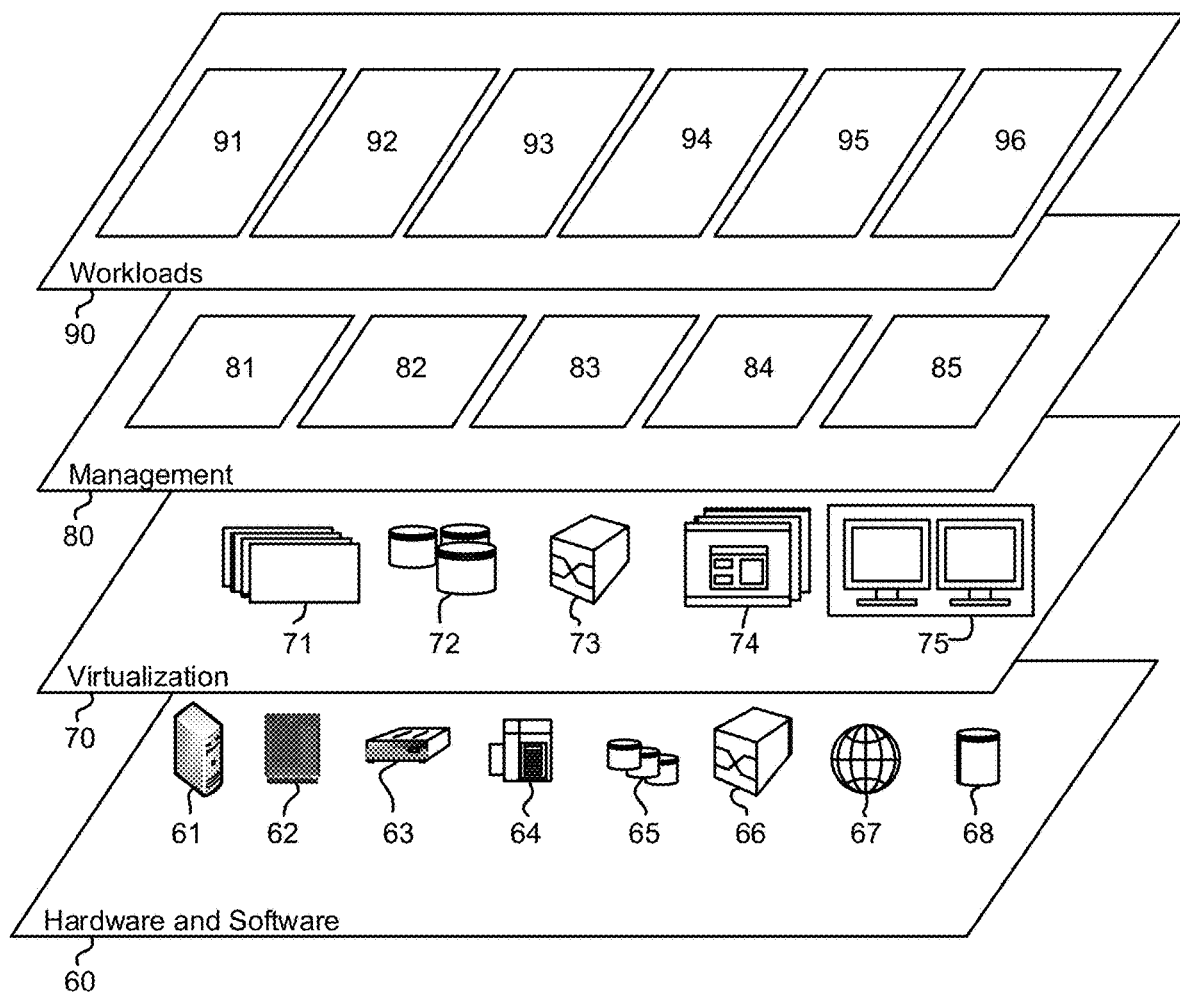
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and data storage and management 96.

Figure 4:
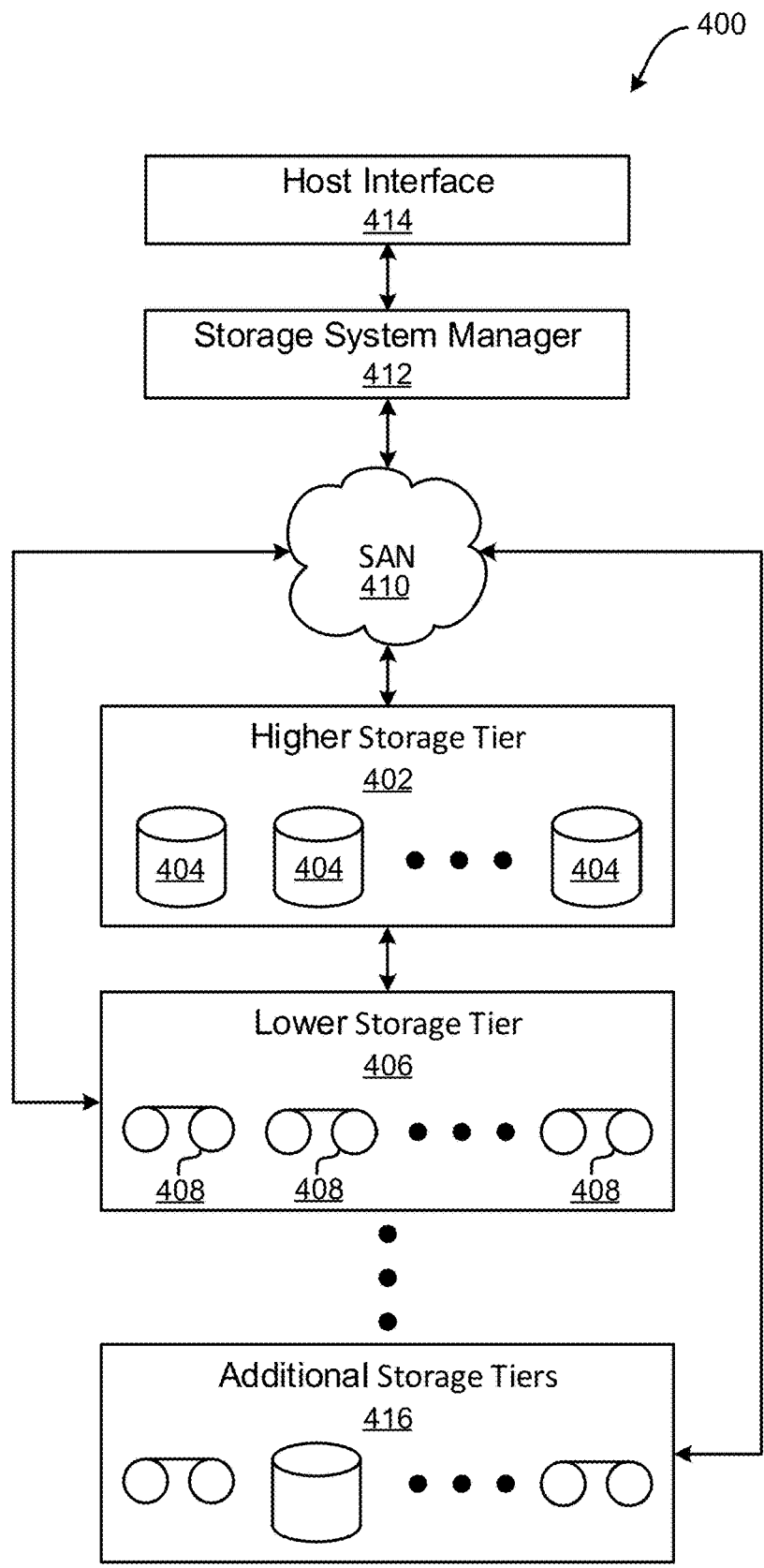
FIG. 4 illustrates a tiered data storage system in accordance with one embodiment.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
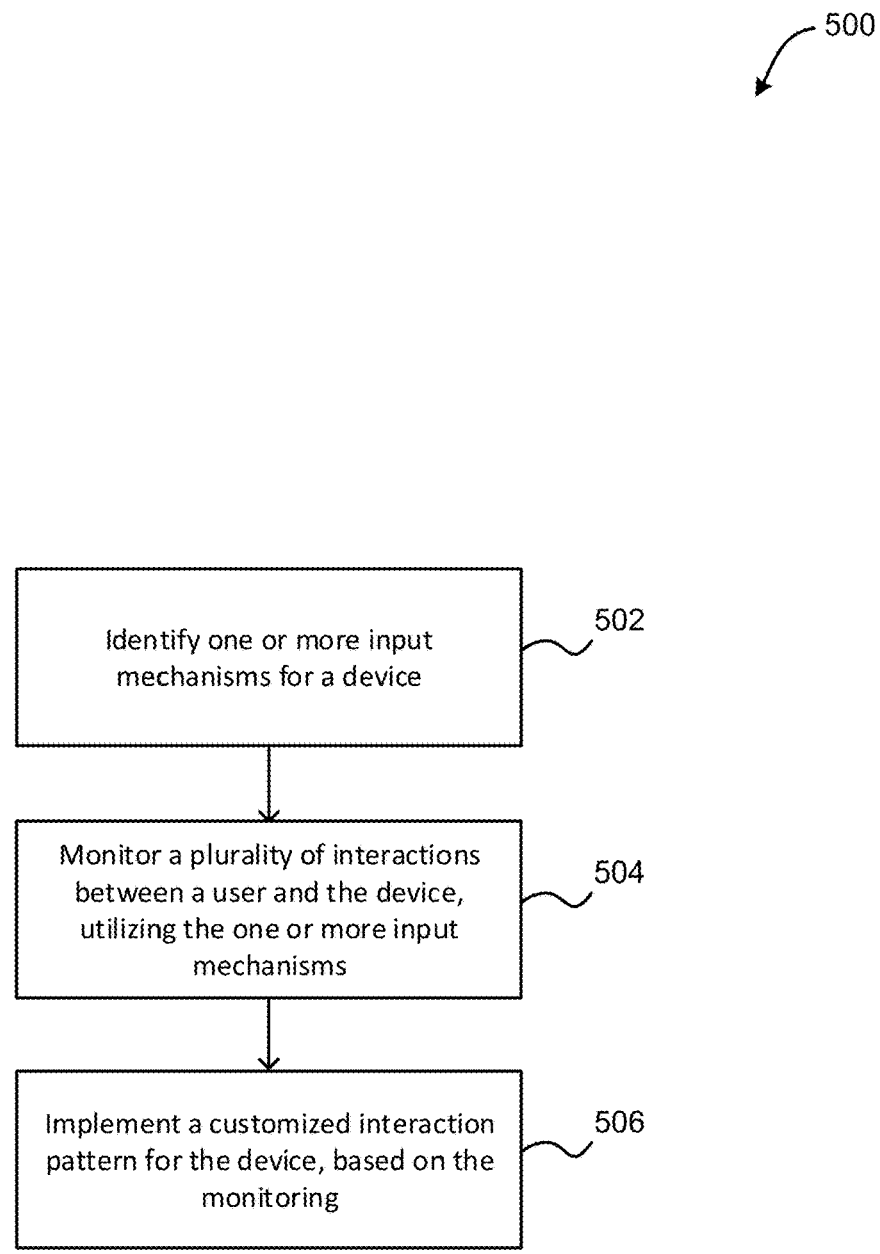
FIG. 5 illustrates a flowchart of a method for implementing a customized interaction pattern for a device, in accordance with one embodiment.

Now referring to FIG. 5, a flowchart of a method 500 is shown according to one embodiment. The method 500 may be performed in accordance with the present invention in any of the environments depicted in FIGS. 1-4 and 6, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where one or more input mechanisms for a device are identified. In one embodiment, the device may include any computing device (e.g., a mobile device, a desktop computing device, etc.). In another embodiment, the input mechanisms may include one or more sensors, cameras, microphones, or other hardware and/or software incorporated within the device that may receive input from a user.

For example, the one or more input mechanisms may include hardware such as one or more cameras of the device, microphones of the device, touch screen of the device, pressure sensor of the device, accelerometer of the device, GPS module of the device, gyroscope of the device, etc. In another example, the one or more input mechanisms may include software such as a facial recognition application, an eye movement recognition application, a touch screen contact tracking application, etc. In yet another example, the input from the user may include verbal input, physical gesture input, tactile input (e.g., finger tapping, dragging, pinching, pressing, etc.), eye movement input, facial expression input, etc.

Additionally, method 500 may proceed with operation 504, where a plurality of interactions between a user and the device are monitored, utilizing the one or more input mechanisms. In one embodiment, the plurality of interactions may include the receipt of input from the user. For example, user input may be received in order to initiate one or more actions performed by the device. In another example, user input may be received as a reaction in response to one or more actions performed by the device. In still another example, the one or more actions may include running one or more applications, displaying predetermined information, etc.

In another embodiment, one or more of the plurality of interactions may be monitored at an application layer of the device. For instance, the one or more actions performed by the device may include one or more actions performed by an operating system of the device, one or more actions performed by one or more applications running on the device, etc.

Further, in one embodiment, the plurality of interactions may include one or more actions performed by the device. For example, the plurality of interactions may include the output of content by the device to the user. For instance, the output of content may include the display of one or more images, the display of one or more advertisements, the playing of one or more audio files, etc.

Further still, in one embodiment, the plurality of interactions may include the adjustment of one or more device settings by the device. For example, the adjustment may include an increasing or decreasing a volume of an output audio of the device, the turning on or off one or more functions and/or modules of the device, etc. In another embodiment, the plurality of interactions may include the running and/or adjustment of one or more applications by the device. In yet another embodiment, the plurality of interactions may occur over a predetermined period of time (e.g., a day, a week, a month, a year, etc.).

Also, in one embodiment, interaction data may be created and stored, based on the monitoring. For example, creating the interaction data may include recording details associated with the plurality of interactions, in response to the input from the user. For example, the details may include a description of the input from the user (e.g., specific user-machine interaction input types, etc.). In another example, the details may include a description of the one or more actions performed by the device. For instance, the details may include content presented by the device to the user, an adjustment of device settings, a running of one or more applications, etc.

In addition, in one embodiment, the details may include one or more applications currently running and/or displayed when the input from the user is received. In another embodiment, the details may include a timing and/or order of one or more of the interactions. In yet another embodiment, the interaction data may be stored in a data structure. For example, each interaction may be stored as a single instance (e.g., object, etc.) within the data structure. In another example, the details associated with an interaction may be stored as metadata associated with/linked to the associated instance.

Furthermore, method 500 may proceed with operation 506, where a customized interaction pattern is implemented for the device, based on the monitoring. In one embodiment, the customized interaction pattern may be implemented at an application layer of the device. For example, the customized interaction pattern may be implemented for one or more predetermined applications of the device. In another embodiment, the customized interaction pattern may be implemented for an operating system of the device.

Additionally, in one embodiment, a customized interaction pattern may be created by analyzing the interaction data created based on the monitoring. In another embodiment, the customized interaction pattern may be created by identifying, from the interaction data, an historical interaction pattern including a recurring order and timing of input from the user as well as the performance of one or more actions by the device both before and after the input from the user.

For example, the historical interaction pattern may include the receipt of input from the user as well as the performance of one or more actions by the device. In another example, the historical interaction pattern may include an indication of a timing and order of the input from the user, a timing and order of the actions of the device, etc.

Further still, in one embodiment, the customized interaction pattern may initiate the sending of one or more instructions to the device to perform one or more actions by the device. For example, the instruction may be sent in response to a portion of the historical interaction pattern being performed. In another example, the instruction may be sent in response to receiving predetermined input from the user, and/or identifying the performance of predetermined actions by the device, in a timing and order that matches a predetermined portion of the historical interaction pattern. In another embodiment, the customized interaction pattern may include a description of the one or more instructions that are instantiated in response to the portion of the historical interaction pattern being performed.

Also, in one embodiment, the implementing may include presenting the customized interaction pattern to the user for approval. For example, the implementing may include displaying, to the user, the description of the one or more instructions that are instantiated in response to the portion of the historical interaction pattern being performed. In another example, the implementing may include receiving input from the user, in response to the displaying. In yet another example, the implementing may include implementing the customized interaction pattern for the device in response to receiving approval from the user.

Additionally, in one embodiment, the implementing may include adding the customized interaction pattern to the device. For example, the customized interaction pattern may be added to a profile for the user within the device. In another example, the implementing may include configuring a user interface interaction profile to remember the customized interaction pattern. In this way, the customized interaction pattern may therefore be implemented when a user is logged into the device.

In another embodiment, the implementing may include adding the customized interaction pattern to the device as a new control sequence for one or more predetermined applications of the device and/or an operating system of the device (e.g., such that control of the one or more applications is dictated at least in part by the customized interaction pattern). In another embodiment, predetermined input from the user outlined in the customized interaction pattern may be added as one or more new control commands for one or more applications and/or an operating system of the device, in accordance with the customized interaction pattern.

Further, in one embodiment, the customized interaction pattern may be implemented for one or more additional devices. For example, the additional devices may include devices owned by the user. In another example, the additional devices may include devices owned by one or more individuals other than the user. For instance, the customized interaction pattern may be sent to the additional devices via a network. In another embodiment, the customized interaction pattern may be implemented for a predetermined group of users and/or devices.

Further still, in one embodiment, the customized interaction pattern may be stored in association with a profile of the user. In another embodiment, one or more additional users matching that profile (or matching a portion of the profile that exceeds a predetermined threshold) may be presented with the customized interaction pattern for approval. In yet another embodiment, the customized interaction pattern may be implemented for the additional users in response to receiving their approval.

Also, in one embodiment, feedback associated with the customized interaction pattern may be collected from one or more users. In another embodiment, the customized interaction pattern may be adjusted, based on the feedback. For example, the adjusting may include changing one or more of the instructions that are sent, changing a portion of the historical interaction pattern that triggers the sending of the one or more instructions, etc.

In addition, in one embodiment, a customized interaction pattern may be implemented for a second device, based on the monitoring of a plurality of interactions between a user and a first device. For example, the second device may be instructed to perform one or more actions, based on input received from the user at the first device.

In this way, by implementing the customized interaction pattern, the device may react more intuitively to user actions, which may improve a user's interaction with the device. Also, by anticipating user actions and proactively reacting, the device may reduce an amount of necessary interaction with the user, which may reduce an amount of processing performed by the device, and which may extend a battery life of the device.

Figure 6:
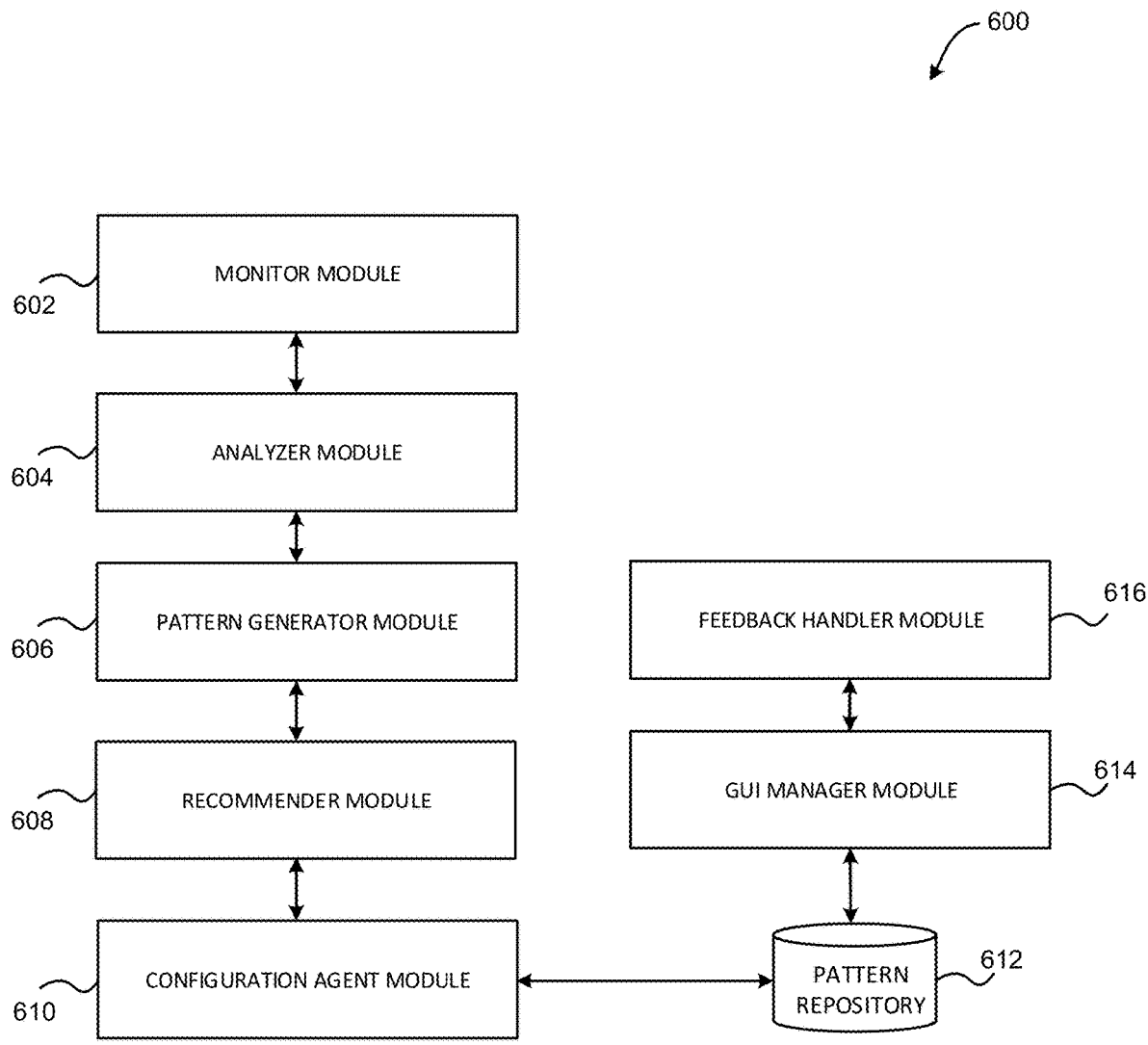
FIG. 6 illustrates an exemplary personalized user-device interaction environment, in accordance with one embodiment.

FIG. 6 illustrates an exemplary personalized user-device interaction environment 600, according to one embodiment. In one embodiment, the environment 600 may be implemented within a single device. In another embodiment, the environment 600 may be implemented within a cloud computing environment. As shown, the environment 600 includes a monitoring module 602 that may monitor usage of a device by a predetermined user, as well as actions performed by the device in response to the usage. For example, the monitoring module 602 may detect when the predetermined user logs into the device, and may proceed with monitoring the usage of the device by the user.

In one embodiment, the monitoring module 602 may detect and record interaction data including both input provided by the user, as well as actions performed by the device. The monitoring module may also detect and record a timing and order of the user input and the device actions. This interaction data may be recorded (e.g., in a data store, etc.) by the monitoring module 602.

Additionally, in one embodiment, the interaction data detected and recorded by the monitoring module 602 may then be analyzed by the analyzer module 604 to determine one or more historical interaction patterns. For example, the analyzer module 604 may retrieve from the data store (or receive from the monitoring module 602) historical interaction data for analysis. The analyzer module 604 may analyze the historical interaction data in order to determine one or more historical interaction patterns between the device and the user. These patterns may be recorded (e.g., in a data store, etc.) by the analyzer module 604.

In one embodiment, the analyzer module 604 may access a predetermined data structure to identify various elements of the interaction data. For example, the analyzer module may compare interaction data to defined data types in the data structure in order to determine a predetermined definition for various interaction data elements (e.g., input from the user, actions performed by the device, etc.).

Further, in one embodiment, the historical interaction patterns determined by the analyzer module 604 may then be used by a pattern generator module 606 to calculate a customized interaction pattern. For example, the pattern generator module 606 may retrieve from the data store (or receive from the analyzer module 604) one or more historical interaction patterns. The pattern generator module 606 may analyze the one or more historical interaction patterns in order to determine a customized interaction pattern between the device and the user.

Further still, in one embodiment, the customized interaction pattern may be sent from the pattern generator module 606 to a recommender module 608. The recommender module 608 may present the customized interaction pattern to the predetermined user of the device (e.g., using a GUI, etc.). The recommender module 608 may also ask for approval by the predetermined user to implement the customized interaction pattern within the system (e.g., by using the customized interaction pattern as a new controlling operation command within the device, etc.).

Also, in one embodiment, upon determining that the user has provided approval to implement the customized interaction pattern within the system, the customized interaction pattern is sent from the recommender module 608 to the configuration agent module 610, which may then implement the customized interaction pattern within the device. For example, the configuration agent module 610 may configure a user interface interaction profile of the device to remember the customized interaction pattern. In another example, the configuration agent module 610 may store the customized interaction pattern in a pattern repository 612. For example, the pattern repository 612 may include a database for storing customized interaction patterns for later implementation (e.g., in response to input/output events involving the device, etc.).

In addition, in one embodiment, a GUI manager module 614 may configure and manage user-machine interaction operations, utilizing the customized interaction patterns stored in the pattern repository 612. For example, the GUI manager module 614 may monitor current user input and device actions in order to determine if the timing and order of such input and actions matches a stored customized interaction pattern. Upon determining that a match is detected, the GUI manager module 614 may implement one or more instructions to perform one or more actions by the device, according to the customized interaction patterns.

Furthermore, in one embodiment, the GUI manager module 614 may access a stored profile for the user, where the stored profile may include personal characteristics and/or preferences for the environment 600. For example, the stored profile may include time and/or location prerequisites for enabling and disabling customized interaction patterns. For instance, a customized interaction pattern may be enabled at a predetermined time and/or location, or may be enabled when a predetermined application is running, may be disabled at a predetermined time and/or location, or when a different predetermined application is running.

Further still, in one embodiment, a feedback handler module 616 may monitor user feedback (e.g., actions performed by the user in response to the implementation of the customized interaction patterns by the GUI manager module 614). In another embodiment, the feedback handler module 616 may adjust one or more customized interaction patterns, based on the feedback.

Figure 7:
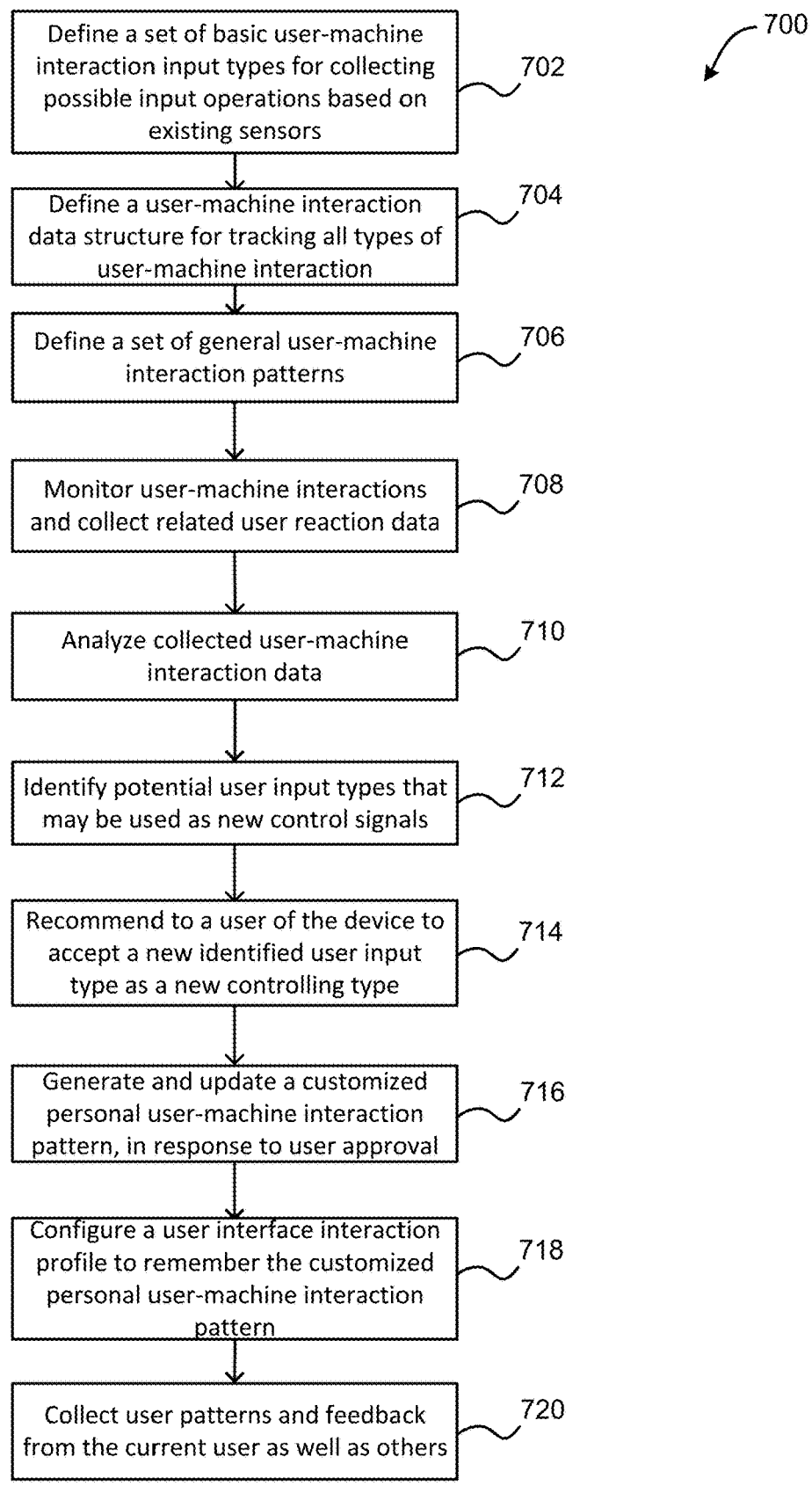
FIG. 7 illustrates a flowchart of a method for personalizing device control based on dynamic user-device interaction analysis and cognitive configuration, in accordance with one embodiment.

Now referring to FIG. 7, a flowchart of a method 700 for personalizing device control based on dynamic user-device interaction analysis and cognitive configuration is shown, according to one embodiment. The method 700 may be performed in accordance with the present invention in any of the environments depicted in FIGS. 1-4 and 6, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a set of basic user-machine interaction input types are defined for collecting possible input operations based on existing sensors. In one embodiment, the input types may include one or more of a user gesture, a user's fingertip movement on a device screen, spoken words or sounds by the user, eye movement of the user, user facial expression recognition, etc.

Additionally, method 700 may proceed with operation 704, where a user-machine interaction data structure is defined for tracking all types of user-machine interaction. In one embodiment, the data structure may include one or more of input types, application names, pop-up names, triggers of context, etc.

Further, method 700 may proceed with operation 706, where a set of general user-machine interaction patterns are defined. Further still, method 700 may proceed with operation 708, where user-machine interactions are monitored, and related user reaction data is collected. Also, method 700 may proceed with operation 710, where collected user-machine interaction data is analyzed. In addition, method 700 may proceed with operation 712, where potential user input types that may be used as a new control signals (e.g., for the device and/or applications within the device) are identified.

Furthermore, method 700 may proceed with operation 714, where a recommendation is made to the user of the device to accept a new identified user input type as a new controlling type for a correlated device and/or application operation. Further still, method 700 may proceed with operation 716, where a customized personal user-machine interaction pattern is generated and updated, in response to user approval of the recommendation.

Also, method 700 may proceed with operation 718, where a user interface interaction profile is configured (e.g., using one or more of addition, deletion, and merge operations, etc.) to remember the customized personal user-machine interaction pattern. Additionally, method 700 may proceed with operation 720, where user patterns and feedback are collected from the current user as well as others for improving a dynamic personalized user interface interaction configuration.

In this way, an intelligent self-defined application control mechanism and framework may be used to learn user-machine interaction, determine a set of operation patterns based on the interaction, and reduce mistakes on operations made by the device. This may enable dynamic personalized device control based on dynamic user-device interaction analysis and configuration, and may improve a user's interaction with the device.

In one embodiment, a device may receive a user selection of an application. For example, a touchscreen of the device may register the tactile selection of an application displayed on the touchscreen. Additionally, the device may run the application, in response to the user selection. Further, the device may display a pop-up advertisement within the device. For example, the application may cause the display of a pop-up advertisement window within the device display.

Further still, in one embodiment, in response to the display of the pop-up advertisement by the device, the device may detect a predetermined facial expression by the user. For example, utilizing one or more cameras of the device, the device may detect that the user is furrowing their brow, is frowning, is scowling, etc. In another embodiment, the device may also detect one or more spoken words or sounds (e.g., a sigh, a statement such as "I hate pop-up ads," etc.) Also, in one embodiment, the device may detect a user selection of an option to remove the pop-up advertisement. For example, the device may detect the tactile selection of an "X" in a corner of the pop-up advertisement.

In addition, in one embodiment, the device may remove the pop-up advertisement, in response to the user selection of the option to remove the pop-up advertisement. Furthermore, the device may monitor and store the user input and the device actions as interaction data. For example, the device may store as interaction data the user selection of the application, the running of the application by the device, the display of the pop-up advertisement by the device, the detection of the facial expression (and/or predetermined spoken content) by the user, the user selection of the option to remove the pop-up advertisement, and the removal of the pop-up advertisement. In another example, a timing and sequence of the interaction data may also be stored in association with the interaction data.

Further still, in one embodiment, the device may utilize the stored interaction data to identify an historical interaction pattern between the user and the device. For example, the device may compare the stored interaction data to additional stored interaction data, and may determine that there are multiple recurring instances of matching stored interaction data (e.g., a number of instances greater than a predetermined threshold, etc.). The device may then create an historical interaction pattern that describes the user selection of an application, the running of the application by the device, the display of a pop-up advertisement by the device, the detection of a predetermined facial expression (and/or predetermined spoken content) by the user, the user selection of an option to remove the pop-up advertisement, and the removal of the pop-up advertisement.

Also, in one embodiment, the device may create a customized interaction pattern, based on the historical interaction pattern between the user and the device. For example, the device may create a customized interaction pattern that automatically removes a pop-up advertisement in response to the display of the pop-up advertisement by the device and the detection of the facial expression (and/or predetermined spoken content) by the user. The device may then ask the user whether they would like to implement the customized interaction pattern within the device. For example, the device may ask the user (via displayed text and/or images) whether they would like to have pop-up advertisements automatically removed in response to a predetermined facial expression (and/or predetermined spoken content) by the user.

Additionally, in one embodiment, in response to receiving approval from the user to implement the customized interaction pattern within the device, the customized interaction pattern is stored in association with a profile of the user. Further, in one embodiment, the device may receive a subsequent user selection of an application. The device may then run the application, in response to the subsequent user selection, and the device may display a pop-up advertisement within the device. The device may then detect the predetermined facial expression (and/or predetermined spoken content) by the user, in response to the display of the pop-up advertisement.

Further still, in response to the detection of the predetermined facial expression (and/or predetermined spoken content) by the user, in response to the display of the pop-up advertisement, the device may automatically remove the pop-up advertisement, according to the customized interaction pattern. Also, the device may monitor the results of implementing the customized interaction pattern and used the results to adjust the customized interaction pattern. For example, the results may include reactions of the user to repeated implementation of the customized interaction pattern, and the adjustments may include the adjustment of a facial expression (and/or predetermined spoken content) threshold that triggers the removal of a displayed pop-up advertisement. In this way, definite and/or intentional user actions may be distinguished from random and/or unintentional user actions, and the responsiveness and accuracy of the device may be enhanced.

In one embodiment, the device may send the stored interaction data to a cloud computing environment, where historical interaction patterns and customized interaction patterns may be created, based on the stored interaction data. The customized interaction patterns may then be sent back to the device from the cloud computing environment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   identifying one or more input mechanisms for a device;
   monitoring a plurality of interactions between a user and the device, utilizing the one or more input mechanisms, the plurality of interactions including:
      a displaying of content of a predetermined type by an application of the device,
      a detection by the device of one or more physical actions of the user, in response to the displaying of the content of the predetermined type, and
      a detection of a selection by the user of an option to remove content of the predetermined type presented by the application of the device; and
   implementing a customized interaction pattern for the device, based on the monitoring, including:
   saving the plurality of interactions as interaction data, in association with a timing and a sequence of the interaction data,
   creating an historical interaction pattern describing the plurality of interactions,
   creating the customized interaction pattern for the device that automatically removes the content of the predetermined type presented by the application in response to the one or more physical actions of the user,
   adding the customized interaction pattern to the device as a new control sequence for the application of the device, and
   storing the customized interaction pattern in association with a profile of the user.

2. The computer-implemented method of claim 1, wherein one or more of the plurality of interactions are monitored at an application layer of the device.

3. The computer-implemented method of claim 1, wherein the customized interaction pattern is implemented for a plurality of predetermined applications of the device.

4. The computer-implemented method of claim 1, wherein the one or more input mechanisms include one or more cameras of the device, one or more microphones of the device, one or more touch screens of the device, one or more pressure sensors of the device, one or more accelerometers of the device, one or more global positioning system (GPS) modules of the device, and one or more gyroscopes of the device.

5. The computer-implemented method of claim 1, wherein the one or more input mechanisms include a facial recognition application, an eye movement recognition application, and a touch screen contact tracking application.

6. The computer-implemented method of claim 1, wherein the plurality of interactions further include verbal input, physical gesture input, tactile input, eye movement input, and facial expression input.

7. The computer-implemented method of claim 1, wherein:
   the one or more input mechanisms include one or more cameras of the device, one or more microphones of the device, one or more touch screens of the device, one or more pressure sensors of the device, one or more accelerometers of the device, one or more global positioning system (GPS) modules of the device, one or more gyroscopes of the device, a facial recognition application, an eye movement recognition application, and a touch screen contact tracking application, and
   the plurality of interactions further include verbal input, physical gesture input, tactile input, eye movement input, and facial expression input.

8. The computer-implemented method of claim 1, wherein the customized interaction pattern is created by identifying, from interaction data created based on the monitoring, an historical interaction pattern including a recurring order and timing of input from the user as well as a performance of one or more actions by the device both before and after the input from the user.

9. The computer-implemented method of claim 1, wherein the customized interaction pattern initiates a sending of one or more instructions to the device to perform one or more actions by the device, in response to receiving predetermined input from the user, and identifying a performance of predetermined actions by the device, in a timing and order that matches a predetermined portion of an historical interaction pattern.

10. The computer-implemented method of claim 1, wherein the implementing includes presenting the customized interaction pattern to the user for approval.

11. The computer-implemented method of claim 1, wherein the implementing includes configuring a user interface interaction profile to remember the customized interaction pattern.

12. The computer-implemented method of claim 1, further comprising implementing the customized interaction pattern for one or more additional devices.

13. The computer-implemented method of claim 1, further comprising:
presenting one or more additional users matching the profile with the customized interaction pattern for approval; and
implementing the customized interaction pattern for the additional users in response to receiving their approval.

14. The computer-implemented method of claim 1, further comprising:
collecting feedback associated with the customized interaction pattern from one or more users; and
adjusting the customized interaction pattern, based on the feedback.

15. The computer-implemented method of claim 1, further comprising implementing the customized interaction pattern for a second device.

16. A computer program product for implementing a customized interaction pattern for a device, the computer program product comprising a computer readable storage medium having program instructions embodied therewith, wherein the computer readable storage medium is not a transitory signal per se, the program instructions executable by a processor to cause the processor to perform a method comprising:
identifying, utilizing the processor, one or more input mechanisms for a device;
monitoring a plurality of interactions between a user and the device, utilizing the processor and the one or more input mechanisms, the plurality of interactions including:
a displaying of content of a predetermined type by an application of the device,
a detection by the device of one or more physical actions of the user, in response to the displaying of the content of the predetermined type, and
a detection of a selection by the user of an option to remove content of the predetermined type presented by the application of the device; and
implementing, utilizing the processor, a customized interaction pattern for the device, based on the monitoring, including:
saving the plurality of interactions as interaction data, in association with a timing and a sequence of the interaction data,
creating an historical interaction pattern describing the plurality of interactions,
creating the customized interaction pattern for the device that automatically removes the content of the predetermined type presented by the application in response to the one or more physical actions of the user,
adding the customized interaction pattern to the device as a new control sequence for the application of the device, and
storing the customized interaction pattern in association with a profile of the user.

17. The computer program product of claim 16, wherein the one or more input mechanisms include one or more cameras of the device, one or more microphones of the device, one or more touch screens of the device, one or more pressure sensors of the device, one or more accelerometers of the device, one or more global positioning system (GPS) modules of the device, and one or more gyroscopes of the device.

18. The computer program product of claim 16, wherein the one or more input mechanisms include a facial recognition application, an eye movement recognition application, and a touch screen contact tracking application.

19. A system, comprising:
a hardware processor; and
logic integrated with the hardware processor, executable by the hardware processor, or integrated with and executable by the hardware processor, the logic being configured to:
identify one or more input mechanisms for a device;
monitor a plurality of interactions between a user and the device, utilizing the one or more input mechanisms, the plurality of interactions including:
a displaying of content of a predetermined type by an application of the device,
a detection by the device of one or more physical actions of the user, in response to the displaying of the content of the predetermined type, and
a detection of a selection by the user of an option to remove content of the predetermined type presented by the application of the device; and
implement a customized interaction pattern for the device, based on the monitoring, including:
saving the plurality of interactions as interaction data, in association with a timing and a sequence of the interaction data,
creating an historical interaction pattern describing the plurality of interactions,
creating the customized interaction pattern for the device that automatically removes the content of the predetermined type presented by the application in response to the one or more physical actions of the user,
adding the customized interaction pattern to the device as a new control sequence for the application of the device, and
storing the customized interaction pattern in association with a profile of the user.

* * * * *